US008423890B2

(12) United States Patent
Oda

(10) Patent No.: US 8,423,890 B2
(45) Date of Patent: Apr. 16, 2013

(54) LAYOUT EDITING APPARATUS AND CONTROL METHOD THEREOF AND COMPUTER-READABLE STORAGE MEDIUM

(75) Inventor: Hirotaka Oda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 53 days.

(21) Appl. No.: 13/041,292

(22) Filed: Mar. 4, 2011

(65) Prior Publication Data

US 2011/0219297 A1 Sep. 8, 2011

(30) Foreign Application Priority Data

Mar. 8, 2010 (JP) ................................. 2010-050757

(51) Int. Cl.
*G06F 17/00* (2006.01)

(52) U.S. Cl.
USPC .......................................................... 715/273

(58) Field of Classification Search .................. 715/273, 715/243, 244, 245, 246, 247, 253
See application file for complete search history.

(56) References Cited

U.S. PATENT DOCUMENTS

| | | | | |
|---|---|---|---|---|
| 4,980,840 A * | 12/1990 | Yin et al. | ....................... | 715/210 |
| 5,148,520 A * | 9/1992 | Morgan | ....................... | 715/212 |
| 5,200,893 A * | 4/1993 | Ozawa et al. | ................. | 715/235 |
| 5,581,670 A * | 12/1996 | Bier et al. | ....................... | 715/856 |
| 6,208,744 B1 * | 3/2001 | Ishige et al. | ................. | 382/100 |
| 7,401,292 B2 * | 7/2008 | Kurashina | ..................... | 715/256 |
| 7,429,993 B2 * | 9/2008 | Hui | ................................ | 345/629 |
| 7,620,906 B2 | 11/2009 | Igeta | | |
| 2006/0026504 A1 * | 2/2006 | Balinsky | ....................... | 715/513 |
| 2007/0101292 A1 * | 5/2007 | Kupka | .......................... | 715/810 |
| 2008/0141117 A1 * | 6/2008 | King et al. | ...................... | 715/238 |
| 2009/0089704 A1 * | 4/2009 | Makela | .......................... | 715/781 |
| 2009/0094544 A1 * | 4/2009 | Savage | .......................... | 715/765 |
| 2009/0150775 A1 * | 6/2009 | Miyazaki et al. | ............. | 715/702 |

FOREIGN PATENT DOCUMENTS

JP 2006-099733 A 4/2006

* cited by examiner

*Primary Examiner* — Laurie Ries
(74) *Attorney, Agent, or Firm* — Canon USA Inc IP Division

(57) ABSTRACT

This invention provides a user interface that aligns an object corresponding to an image or a text on an object corresponding to a page of an electronic album and displays the object in a list so that the user can easily, visually, and correctly recognize change of alignment of the objects when editing a layout of the objects. In an information processing apparatus of the present invention, a plurality of pages and reduced images corresponding thereto are orderly displayed in a list in a window. When first one of the reduced images is dragged and overlaps with second one of the reduced images, the second reduced image is shifted from an original alignment position and displayed in the window. When the first reduced image is dropped at an original alignment position of the second reduced image, an order of each page is changed.

14 Claims, 11 Drawing Sheets

LAYOUT EDITING APPARATUS AND CONTROL METHOD THEREOF AND COMPUTER-READABLE STORAGE MEDIUM

BACKGROUND OF THE INVENTION

1. Field of the Invention

The present invention relates to a technique for aligning an object corresponding to an image or text on an object corresponding to a page of an electronic album, displaying the object in a list, and editing layout thereof.

2. Description of the Related Art

A conventional information processing apparatus allows a user to align an object such as a thumbnail image on an application window and display the object in a list, and then, using a pointing device, to drag and drop the object to change a display order of the objects. At this time, while the user is dragging the object, the information processing apparatus informs the user of a destination by changing a color of a frame of the destination when the object is dropped at a place where the object is dragged.

However, even when the color of the frame is conventionally changed, due to a plurality of frames disposed close to each other, or due to a picture or a color of background where the frame is disposed or a shape and a color of the object to be dragged, the user has had difficulty to instinctively find the destination of the object.

SUMMARY OF THE INVENTION

The present invention is directed to provide a user interface for allowing a user to easily and correctly recognize a change of alignment of objects with high visibility.

According to an aspect of the present invention, a layout editing apparatus that aligns a plurality of objects in order and displays the objects in a window, includes: a detection unit configured to detect that one of the plurality of objects overlaps with another object thereof; and a display unit configured to, when the detection unit detects that the one object overlaps with another object, display another object shifting from an alignment position.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Configuration elements described in exemplary embodiments are merely examples and are not intended to limit a scope of the present invention thereto.

Figure 1:
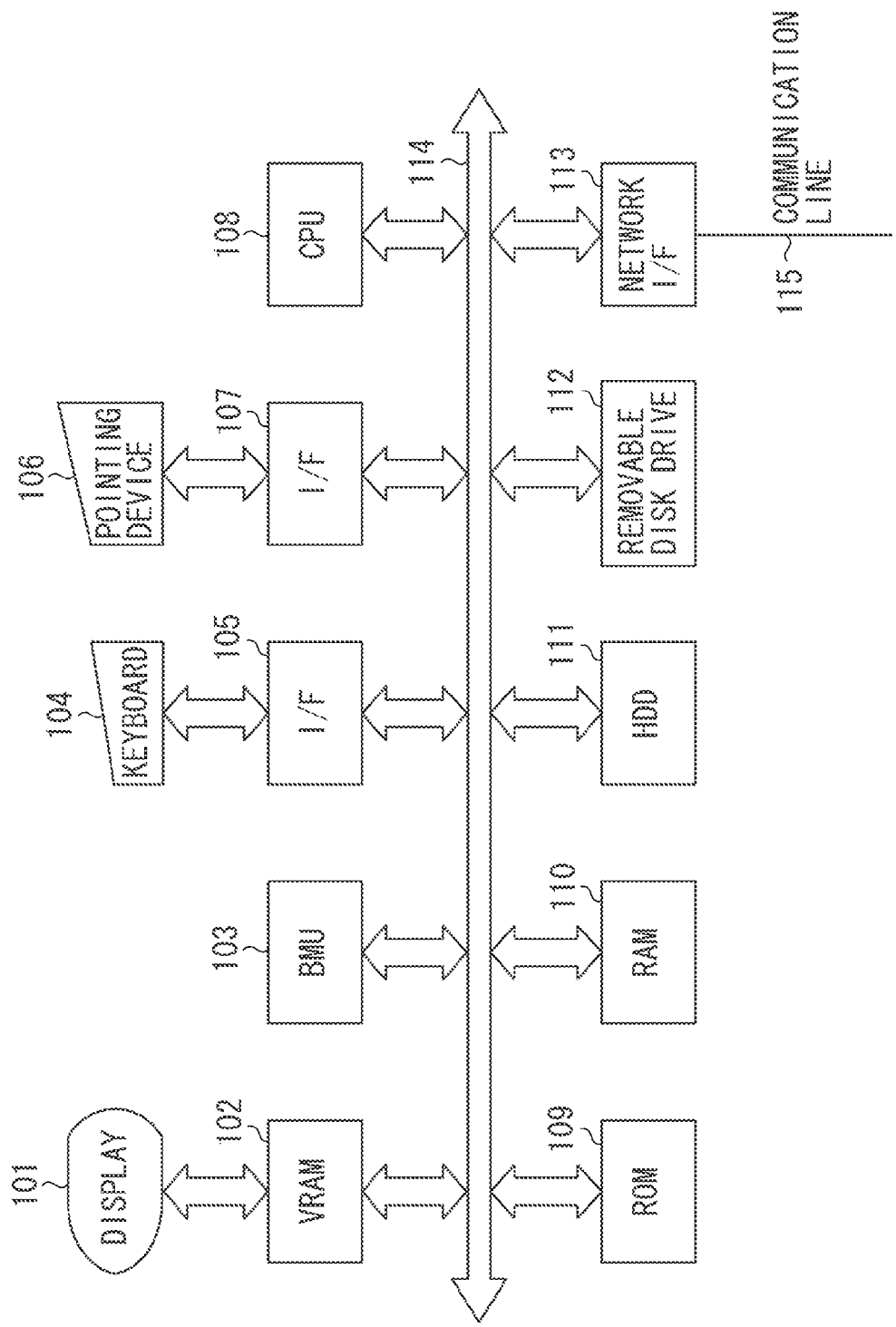
FIG. 1 is a block diagram illustrating a configuration of a layout editing apparatus according to an exemplary embodiment of the present invention.

FIG. 1 is a block diagram for describing a configuration of a layout editing apparatus that processes a program code for realizing a function of a first exemplary embodiment. A layout editing apparatus 100 can be realized by an information processing apparatus such as a personal computer and a mobile communication apparatus. Further, the layout editing apparatus 100 includes a display 101, a video random access memory (VRAM) 102, a bit move unit (BMU) 103, a central processing unit (CPU) 108, a read only memory (ROM) 109, a random access memory (RAM) 110, a hard disk (HDD) 111, and a removable disk drive 112.

Further, the layout editing apparatus 100 includes a keyboard 104, a pointing device 106, and a network I/F 113. On the display 101, for example, edition information about a document file, a graphic file, an image file that are being edited, and user interface information such as an icon, a message, and a menu are displayed. An image to be displayed on the display 101 is drawn on the VRAM 102.

The image drawn on the VRAM 102 is transferred to the display 101 according to a predetermined regulation, and thus, an image is displayed on the display 101. The BMU 103 controls, for example, data transfer between memories (e.g., between VRAM 102 and other memory), data transfer between a memory and each I/O device (e.g., network I/F 111). A keyboard 104 includes various types of keys for inputting characters.

A pointing device 106 is used for, for example, selecting a content such as an icon and a menu displayed on the display 101 and operating drag and drop. The CPU 108 controls each device based on a control program stored in the ROM 109, the HDD 111 or the removable disk drive 112. The ROM 109 stores various types of control programs and data. The RAM 110 includes a work region of the CPU 108, a saving region of the data when an error is processed, and a region for loading the control program.

The HDD 111 stores various types of control programs and content data. For example, the HDD 111 of the present exemplary embodiment stores album data, album edition program, image data, and text data that will be described later and an operating system (OS). The removable disk drive 112 controls access to a removable disk such as a compact disk-ROM (CD-ROM).

The network I/F 113 provides communication with other information processing apparatus and an external devices such as a printer via a network. The CPU bus 114 includes an address bus, a data bus, and a control bus. Control programs can be supplied to the CPU 108 from the ROM 109, the HDD 111, and the removable disk drive 112, and further from other information processing apparatus using the network via the network I/F 113.

A first control program for the CPU 108 is an application management control program for managing a plurality of application programs. The CPU 108 controls and manages input from the keyboard 104 and the pointing device 106 according to the application management control program and performs input processing on the application program under management.

The CPU 108 further controls access to the HDD 111, the removable disk drive 112, and the network I/F 113 according to the application program under management. The CPU 108 furthermore performs drawing processing on the VRAM 102 and display processing on the display 101 according to a drawing demand by the application program under management.

Moreover, the CPU 108 performs memory control of each application program by combining the RAM 110 and the HDD 111 according to a memory demand by the application program under management. In the present exemplary embodiment, the application management control program is described as the OS, and the application program under management is described as the album edition program.

Figure 2:
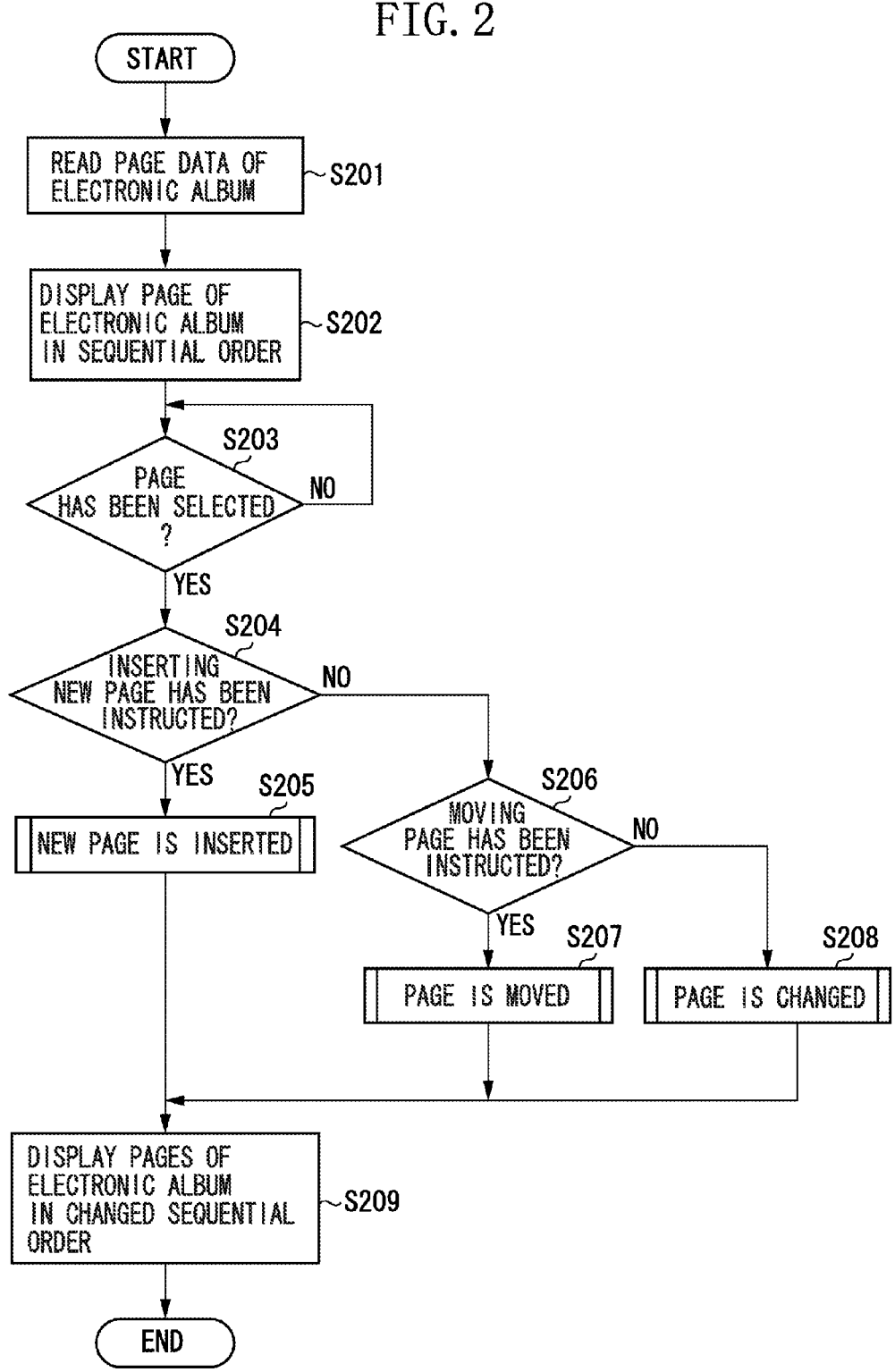
FIG. 2 is a flowchart illustrating an operation performed by a layout editing apparatus according to an exemplary embodiment of the present invention.

FIG. 2 is a flowchart illustrating an operation in which the layout editing apparatus 100 of the present exemplary embodiment changes an order of a plurality of pages included in an electronic album. The operation described below is realized when the CPU 108 of the layout editing apparatus 100 reads and activates the OS and the album edition program from the HDD 111 and controls the above-described various types of modules according to the OS and the album edition program.

Firstly, in step S201, the CPU 108 reads page data about a page included in the electronic album from the HDD 111. The page data includes attribute information about an order of respective pages, a file path of image data and text data disposed on each page, and a place where the image data and the text data are disposed. The CPU 108 may download page data from a server device on the network 115 and store it in the HDD 111, and then read it.

In step S202, the CPU 108 compares the page order of respective pages read in the step S201, and aligns the read pages in order according to the comparison result and displays the plurality of pages in a page list region.

Figure 3:
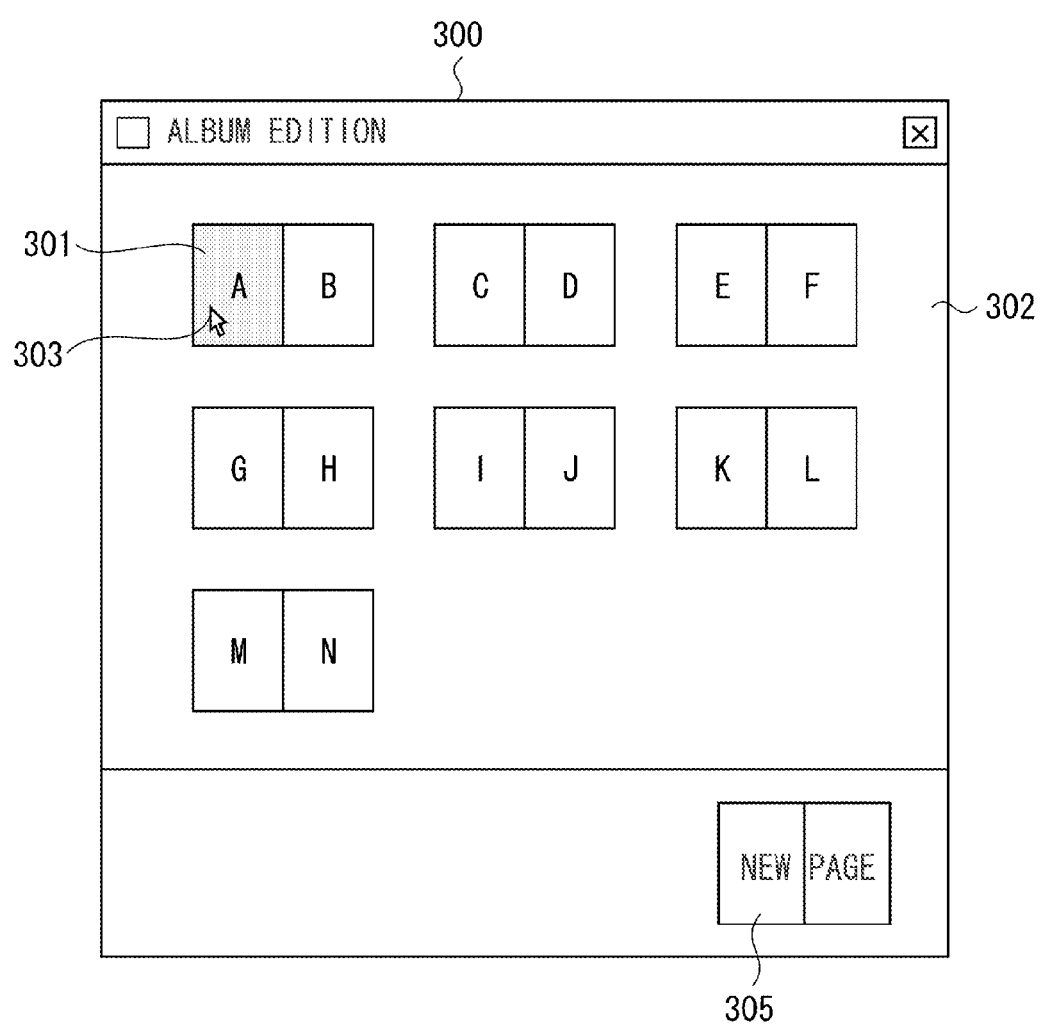
FIG. 3 is a diagram illustrating a window according to an exemplary embodiment of the present invention.

FIG. 3 illustrates a state in which the CPU 108 aligns and displays the plurality of pages of the electronic albumin a page list region 302 in a window 300 of the album edition program. In the page list region 302, reduced images 301 of the pages are displayed closely to each other while a pair of pages constitutes spread two pages. Instead of the reduced image, an icon corresponding to each page may be displayed.

In order from the reduced image 301 of a front page, the pages are aligned and displayed in a direction from upper left to lower right of the page list region 302. The direction of the display order is not limited to the above-described direction. Further, page list region 302 displays a new page insertion icon 305 corresponding to a new page in addition to the page currently included in the electronic album. The user operates the pointing device 106 and moves the mouse cursor 303 to select any one of the reduced image 301 or the icon 305 of the newly inserted page.

In step S203, the CPU 108 determines whether the page is selected. The CPU 108 determines that the page is selected when the reduced image 301 or the new page insertion icon 305 displayed in the page list region 302 is dragged. When the page is determined to be selected in step S203 (YES in step S203), in step S204, the CPU 108 determines whether an instruction to insert a new page is given. When it is determined that the instruction to insert the new page is given (YES in step S204), in step S205, the CPU 108 performs insertion processing on the new page.

In step S204, when the new page insertion icon 305 is dragged, the CPU 108 determines that the instruction to insert the new page is given, and when the reduced image 301 is dragged, it is determined that an instruction to move or exchange the page is given.

On the other hand, in step S204, when it is determined that the instruction to insert the new page is not given (NO in step S204), in step S206, it is determined whether the instruction to move the page is given. In step S206, the CPU 108 calculates an area in which the reduced image of the page being dragged overlaps with the reduced image of another page. When the overlapping area is smaller than a predetermined value, it is determined that the instruction to move the page is given (YES in S206). When the overlapping area is larger than the predetermined value, it is determined that the instruction to exchange the page is given (NO in S206).

The CPU 108 may determine the instruction in step S206 by, instead of a size of the area of the overlapping images, an overlapping state such as a positional relationship in the overlapping. Further, the CPU 108 may determine the instruction by a short cut operation using the keyboard 104, a selection operation from a menu, and a click operation by a predetermined button of the pointing device 106.

When it is determined that the instruction to move the page is given (YES in step S206), in step S207, the movement processing is performed on the page. If not (NO in step S206), in step S208, the exchange processing is performed on the page. In step S209, according to the changed order, the CPU 108 exchanges the alignment of the plurality of pages of the electronic album and displays them in the page list region 302, and then the processing ends.

Figure 4:
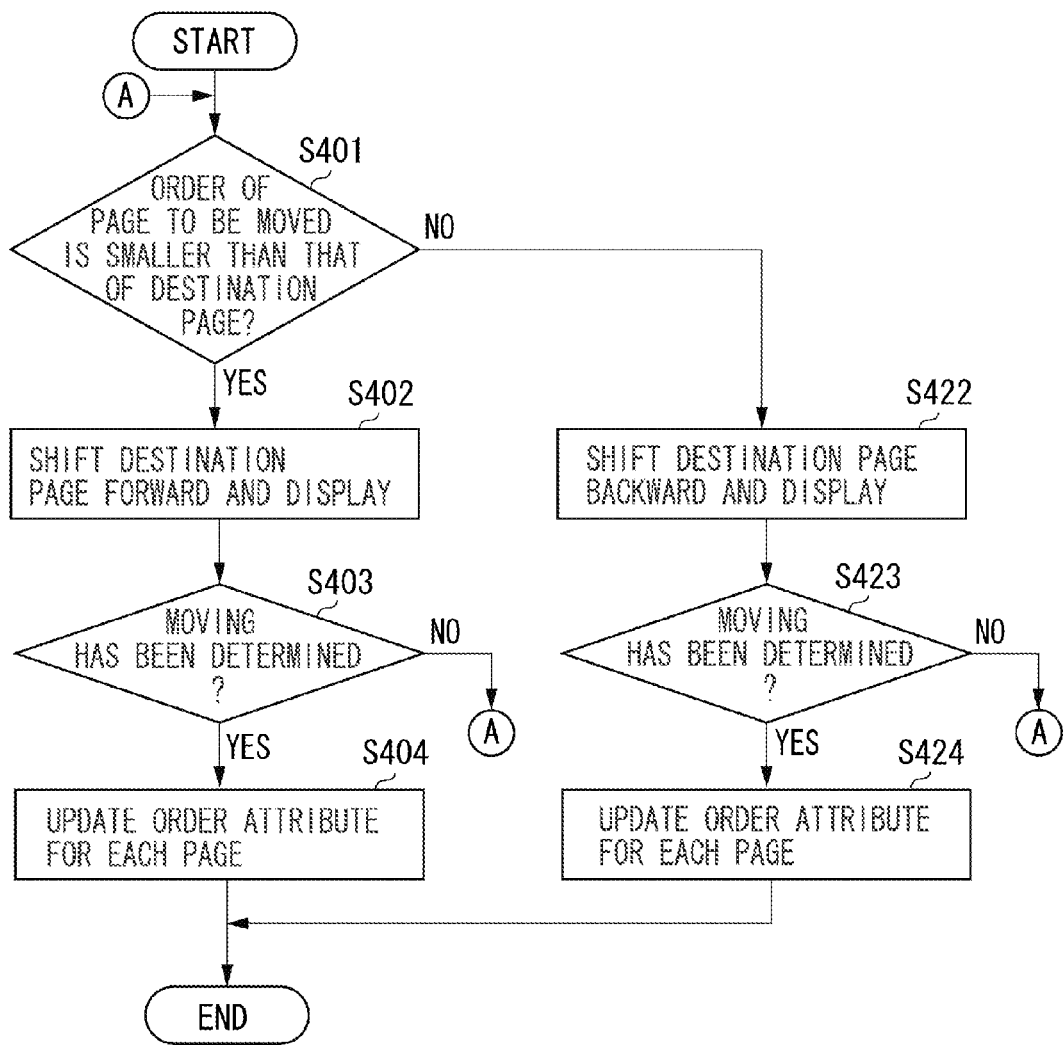
FIG. 4 is a flowchart illustrating an operation performed by a layout editing apparatus according to an exemplary embodiment of the present invention.

FIG. 4 illustrates a flow of an operation in which the CPU 108 performs movement processing in step S207. Firstly, in step S401, the CPU 108 compares an order attribute value "x" indicating an order of a page "A" to be moved with an order attribute value "y" of a destination page "E". As a result of the comparison in step S402, when "x" is smaller than "y", it is determined that the page is moved from the front to the back, and, in step S402, the CPU 108 shifts a destination page "E" horizontally forward in the alignment direction from an alignment position and displays the destination page "E".

Figure 5A:
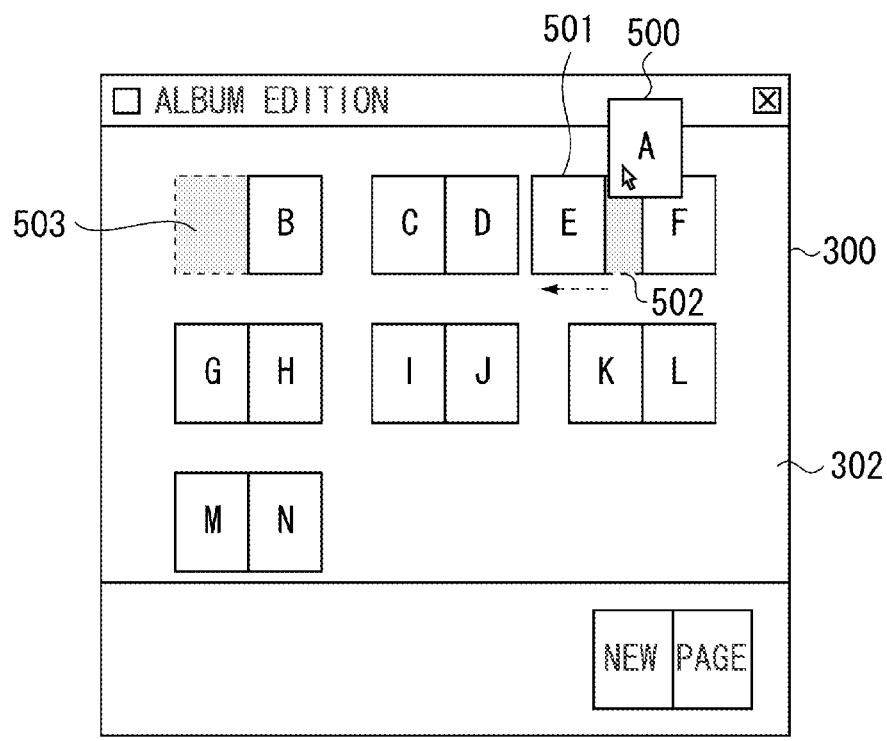
FIGS. 5A and 5B are diagrams illustrating windows according to an exemplary embodiment of the present invention.

FIG. 5A illustrates a state in which a reduced image 500 of the page "A" to be moved is dragged from the state illustrated in FIG. 3 to a alignment position 502 of the destination page "E" and a reduced image 501 of the destination page "E" is displayed as being shifted forward from the alignment position 502. At this point, an alignment position 503 of the page "A" to be moved becomes empty and displayed in gray. With this arrangement, the user can easily, visually recognize the destination of the page to be moved, and also recognize that the alignment position of the destination page is shifted forward by this movement.

When the CPU 108 detects that the destination of the page "A" to be moved is determined to be the alignment position of the destination page "E" (YES in step S403), in step S404, the order attribute value of each page is updated. In step S404, the CPU 108 updates the order attribute value of the page "A" to be moved, with the order attribute "y" of the destination page "E". From the order attribute values of the destination page "E" and pages "B", "C", and "D" that are smaller than the order attribute value "y" and larger than "x", "1" is subtracted.

As described above, the order attribute value of each page is changed. Thus, in step S209, according to the changed order attribute values, the CPU 108 changes the alignment of the reduced images of the pages and displays them in the page list region 302.

Figure 5B:
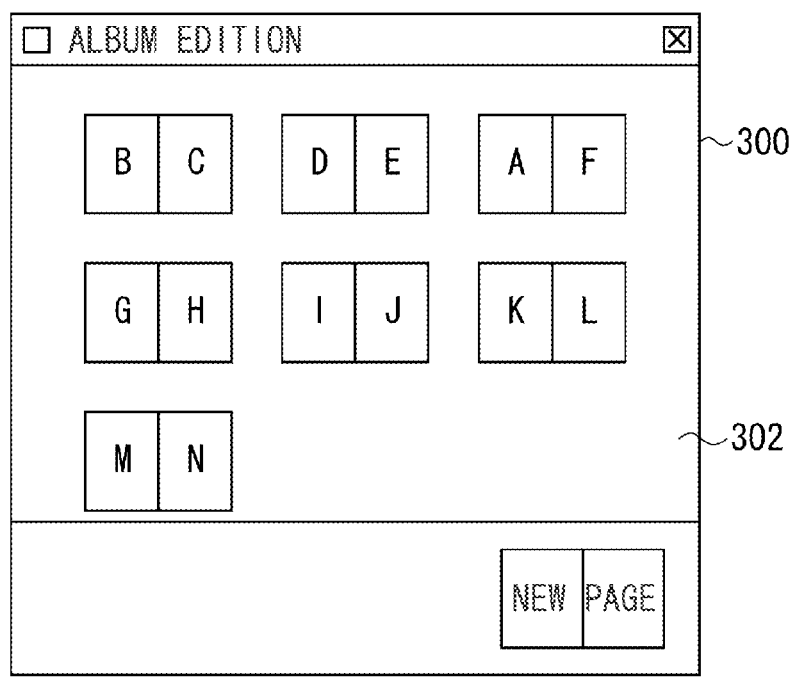

FIG. 5B illustrates contents which the CPU 108 displays in the page list region 302 in step S209. The reduced image of the page "A" to be moved is displayed at the original alignment position of the destination page "E", and the destination page "E", and the reduced images of the pages "B", "C", and "D" that have existed between the page "A" to be moved and the destination page "E" are moved forward by one page.

Further, as a result of comparison in step S401, when "x" is larger than "y" (YES in step S401), it is determined that the page is moved from behind to the front, and in step S422, the CPU 108 displays the destination page "E" as being shifted backward horizontally to the alignment direction from the alignment position.

Figure 6A:
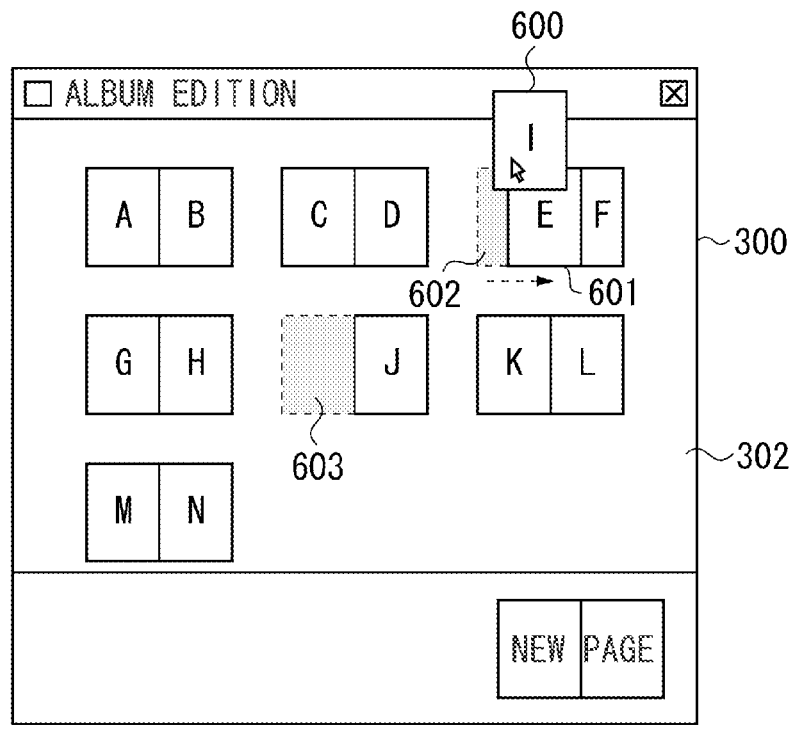
FIGS. 6A and 6B are diagrams illustrating windows according to an exemplary embodiment of the present invention.

FIG. 6A illustrates a state in which a page "I" 600 to be moved is dragged from the state illustrated in FIG. 3 to the vicinity of an alignment position 602 of the destination page "E" 601 and the destination page "E" 601 is displayed as being shifted backward from the alignment position 602. At this point, a alignment position 603 of the page "I" 600 to be moved becomes empty and displayed in gray. With this arrangement, the user can easily, visually recognize the destination of the page to be moved, and also recognize that the alignment position of the destination page is shifted backward by this movement.

When the CPU 108 detects that the destination of the page "I" to be moved is determined to be the alignment position of the destination page "E" (YES in step S423), in step S424, the CPU 108 updates the order attribute value of each page. In step S424, the CPU 108 updates the order attribute value of the page "I" to be moved, with the order attribute value "y" of the destination page "E". To the order attribute values of the destination page "E" and pages "F", "G", and "H" that are larger than the order attribute value "y" and smaller than "x", "1" is added.

As described above, the order attribute value of each page is changed. Thus, in step S209, according to the changed order attribute values, the CPU 108 changes the alignment of the reduced images of the pages and displays them in the page list region 302.

Figure 6B:
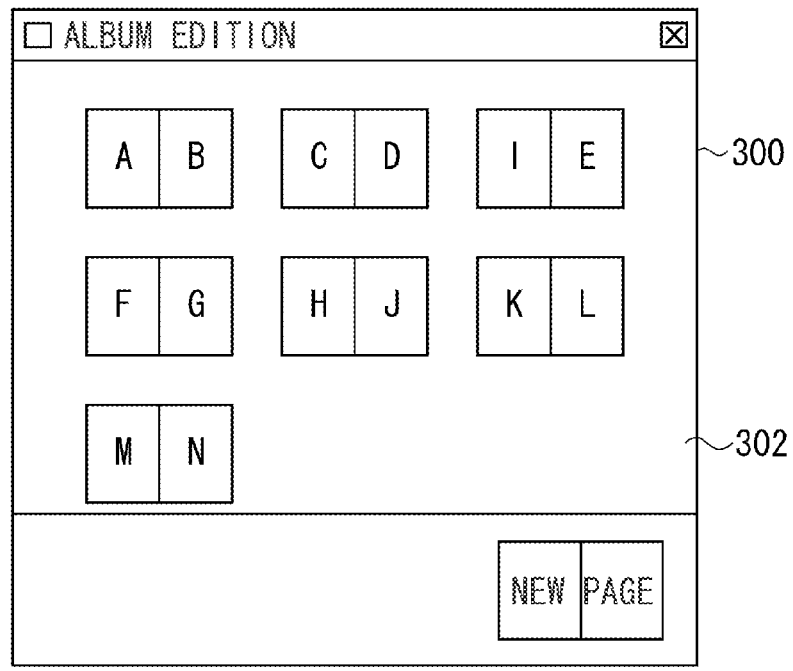

FIG. 6B illustrates contents which the CPU 108 displays in the page list region 302 in step S209. The page "I" to be moved is displayed at the original alignment position of the destination page "E", and the destination page "E", and the pages "F", "G", and "H" that have existed between the page "I" 600 to be moved and the destination page "E" are moved backward by one page.

In steps S403 and S423, the CPU 108 detects that the destination of the page to be moved is determined to be the alignment position of the destination page when the reduced image of the page to be moved is dropped at the alignment position of the destination page.

As described above, according to the present exemplary embodiment, the CPU 108 performs control to switch a direction in which the reduced image of the destination page is shifted from the alignment position, depending on whether the page to be moved exists in front of or at the back of the destination page.

Figure 7:
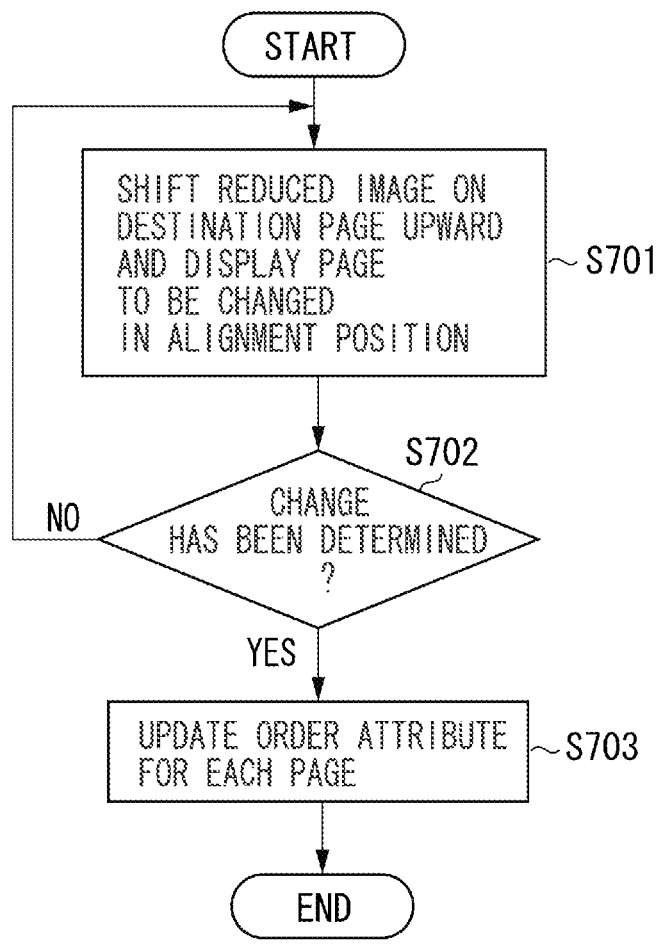
FIG. 7 is a flowchart illustrating an operation performed by a layout editing apparatus according to an exemplary embodiment of the present invention.

FIG. 7 illustrates a flow of an operation in which the CPU 108 performs exchange processing in step S208. In S701, the CPU 108 displays the reduced image of the page to be exchanged as being shifted to the upper of the alignment position of the exchange destination page and also displays the reduced image of the exchange destination page as being shifted to the upper vertically to the alignment direction of the alignment position where the page to be exchanged originally has existed.

Figure 8A:
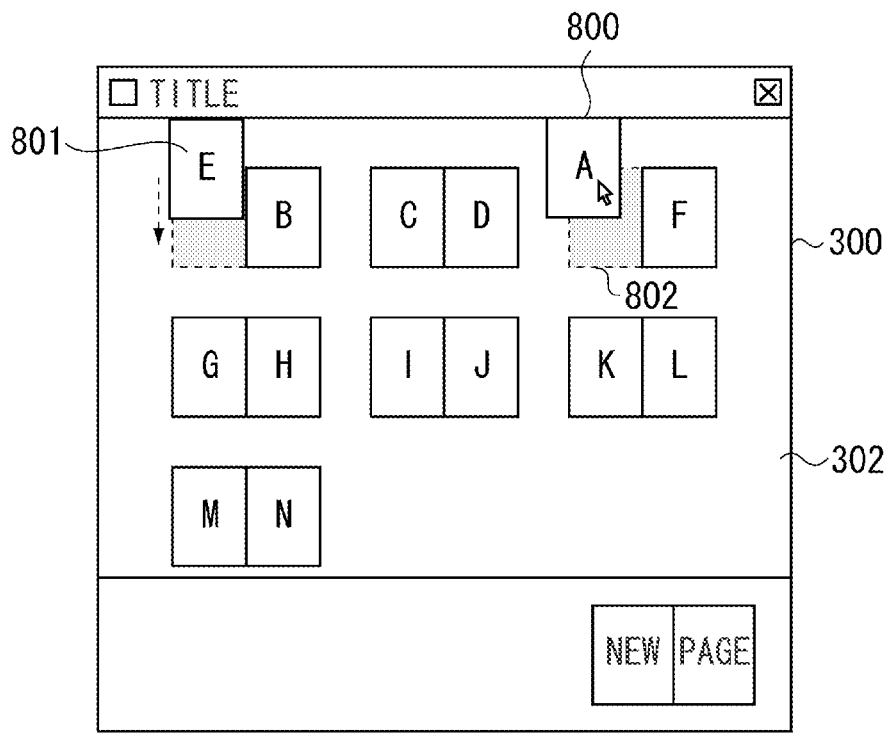
FIGS. 8A and 8B are diagrams illustrating windows according to an exemplary embodiment of the present invention.

FIG. 8A illustrates a state in which a reduced image 800 of the page "A" to be exchanged is dragged from a state illustrated in FIG. 3 to an alignment position 802 of the exchange destination page "E" and displayed. At this point, the reduced image 801 of the exchange destination page "E" is displayed as being shifted upward from the alignment position 803 of the page "A" to be exchanged. With this arrangement, the user can easily, visually recognize exchange of the pages, and also recognize which pages are exchanged with each other by this exchange.

In step S702, when the CPU 108 detects that the page "A" to be exchanged and the exchange destination page "E" are determined to be exchanged with each other, in step S703, the CPU 108 updates the order attribute values of the page "A" to be exchanged and the exchange destination page "E". In step S703, the CPU 108 updates the order attribute value "x" of the page "A" to be exchanged with the order attribute value "y" of the exchange destination page "E", and the order attribute value "y" of the exchange destination page "E" is updated with the order attribute value "x" of the page "A" to be exchanged.

In step S702, the CPU 108 detects that the orders of the page to be exchanged and the exchange destination page are determined to be exchanged when the reduced image of the page to be exchanged is dropped at the alignment position of the exchange destination page.

As described above, since the order attribute values of the page to be exchanged and the exchange destination page are changed, in step S209, the CPU 108 displays in a page list region 302 a result in which the page to be exchanged and the exchange destination page are exchanged to each other according to the changed order attribute values.

Figure 8B:
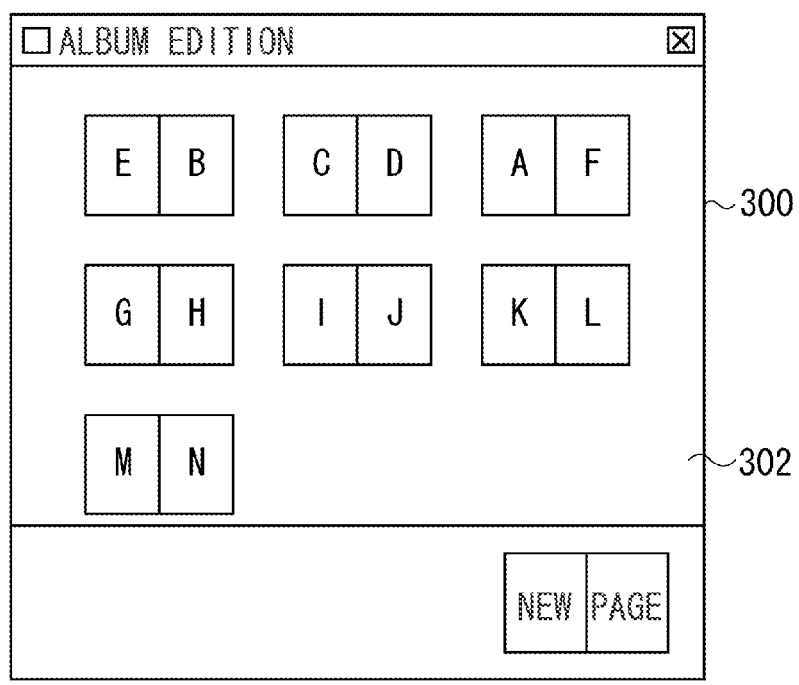

FIG. 8B illustrates contents that the CPU 108 displays in the page list region 302 in step S209. The reduced image of the page "A" to be exchanged is displayed at the original alignment position of the exchange destination page "E", and the reduced image of the exchange destination page "E" is displayed at the original alignment position of the page "A" to be exchanged.

Figure 9:
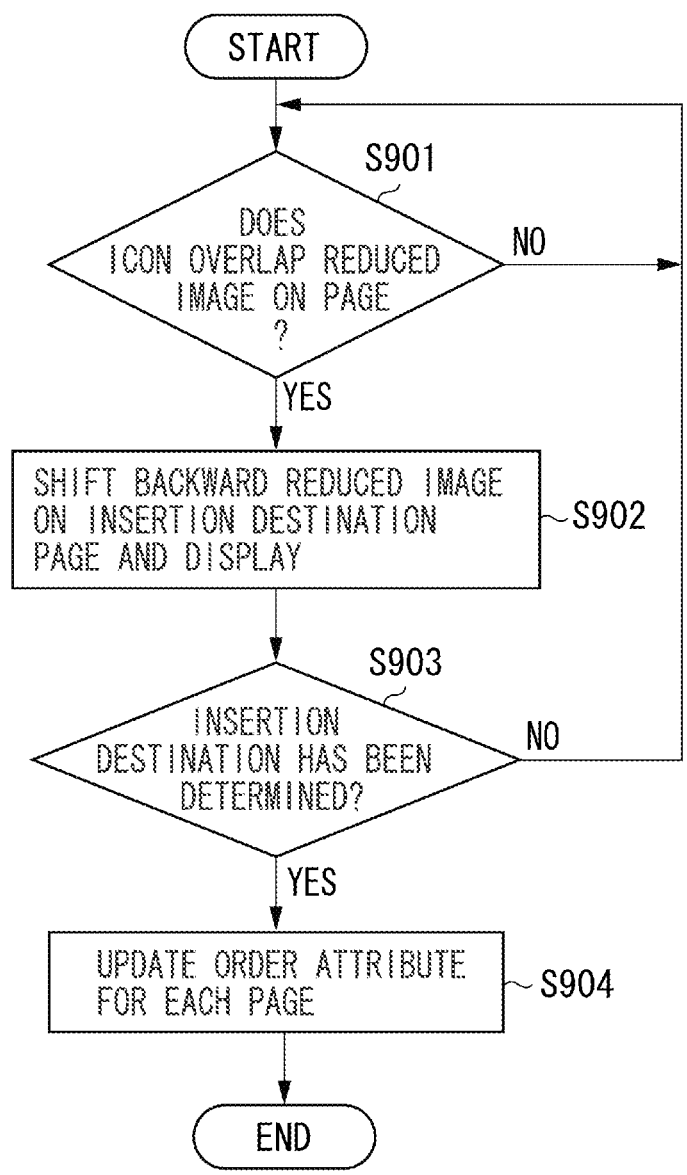
FIG. 9 is a flowchart illustrating an operation performed by a layout editing apparatus according to an exemplary embodiment of the present invention.

FIG. 9 illustrates a flow of an operation in which the CPU 108 performs insertion of a new page in step S205. The CPU 108 detects that a new page insertion icon is overlapping with a reduced image of a page displayed in the page list region 302 (YES in step S901). In step S902, the CPU 108 displays spread two pages including the page overlapping with the new page insertion icon, shifting the image backward from the alignment position as a pair of insertion destination page.

Figure 10A:
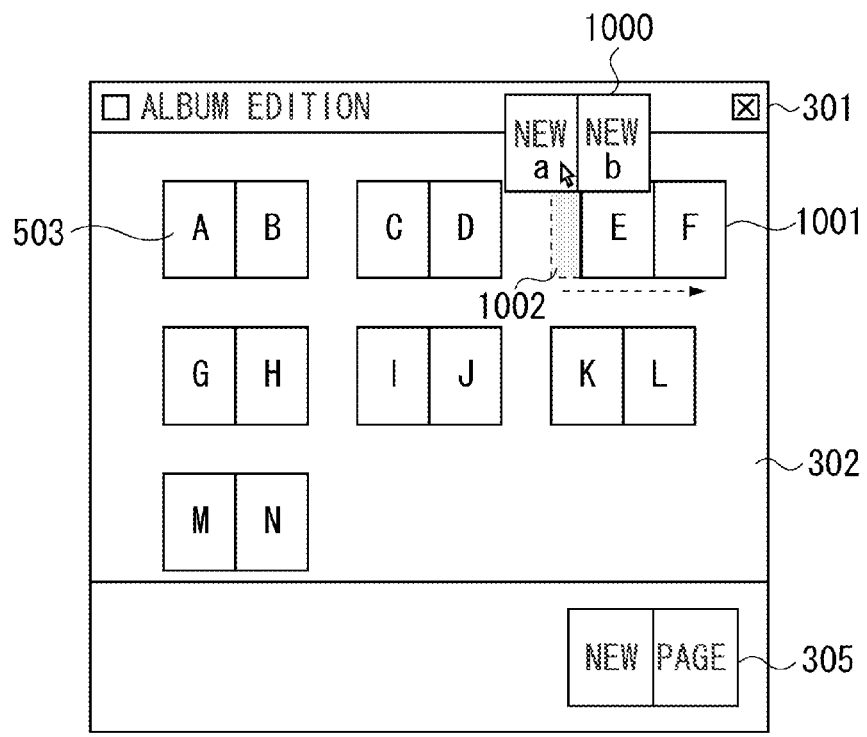
FIGS. 10A and 10B are diagrams illustrating windows according to an exemplary embodiment of the present invention.

FIG. 10A illustrates a state in which a new page insertion icon 1000 is dragged from the state illustrated in FIG. 3 to an alignment position 1002 of an insertion destination page "E and F" and a reduced image 1001 of the insertion destination page "E and F" is displayed as being shifted backward. With this arrangement, the user can easily, visually recognize the insertion destination of the new page, and also recognize that the insertion destination page is shifted backward by this insertion. The new page insertion icon 1000 represents a display state when the icon 305 is clicked and dragged into the page list region 302.

When the CPU 108 detects that the insertion destination of the new page is determined to be the alignment position of the insertion destination page "E and F" (YES in step S903), in step S904, the CPU 108 updates the order attribute value of each page.

In step S904, the CPU 108 substitutes the order attribute value of the insertion destination page "E and F" into the order attribute value of the new page, and "2" is added to the order attribute values of the pages following the spread page "E and F". In step S903, the CPU 108 detects that the insertion destination of the new page is determined when the new page insertion icon is dropped at the alignment position of the insertion destination page.

As described above, the order attribute value of each page is changed. Thus, in step S209, according to the changed order attribute values, the CPU 108 changes the alignment of the reduced images of the pages and displays them in the page list region 302.

Figure 10B:
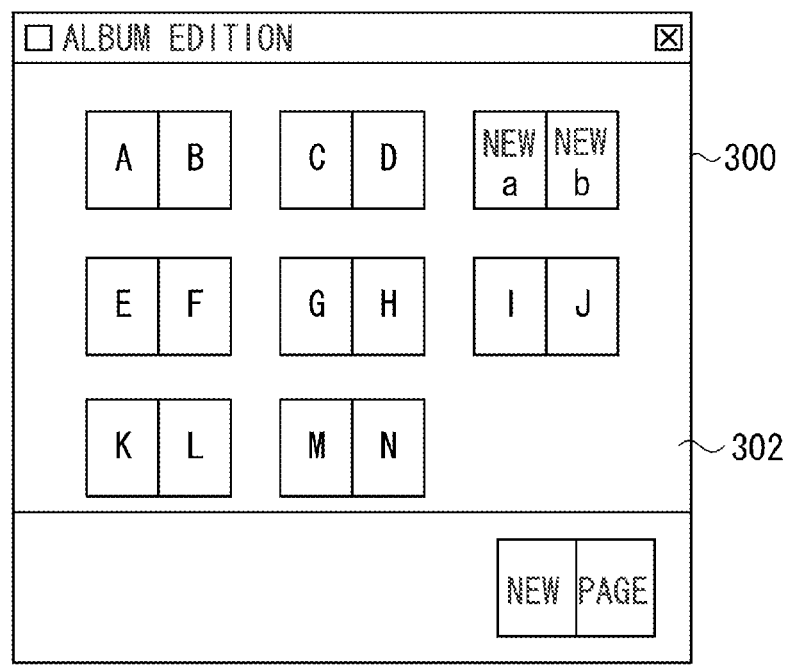

FIG. 10B illustrates contents which the CPU 108 displays in the page list region 302 in step S209. The reduced image of a new page "A and B" is displayed at an original alignment position of the insertion destination page "E and F", and the reduced images of the pages following the insertion destination page "E and F" are displayed at the alignment positions shifted backward by two pages from the original alignment positions thereof.

In the present exemplary embodiment, the object is described as the reduced image or the icon of the page included in the electronic album. However, even if the object is a reduced image or an icon of an image or a text instead of the page, similarly, the present invention can be realized.

According to the present exemplary embodiment, in addition to the changed destination of the page to be changed, the user can easily, visibly recognize the direction in which other pages are shifted by this change, thus increasing convenience.

In the first exemplary embodiment, when the movement processing is performed in step S207, according to the positional relationships of the order of the page to be moved and the destination page, the direction in which the reduced image of the destination page is shifted from the alignment position is determined.

In the second exemplary embodiment, according to the direction in which the reduced image of the page to be moved approaches the alignment position of the destination page, the direction in which the reduced image of the destination page is shifted from the alignment position thereof is determined. Descriptions of same configurations as those in the first exemplary embodiment will not be repeated, and configurations unique to the present exemplary embodiment will be described in detail as follows.

The CPU 108 detects the direction in which the reduced image of the page to be moved approaches the reduced image of the destination page. When the CPU 108 detects that the reduced image 1100 of the page "A" to be moved approaches the reduced image 1101 of the destination page "E" from behind and overlaps therewith, the CPU 108 displays the reduced image 1101 of the destination page "E" shifting forward from the alignment position 1102.

Figure 11A:
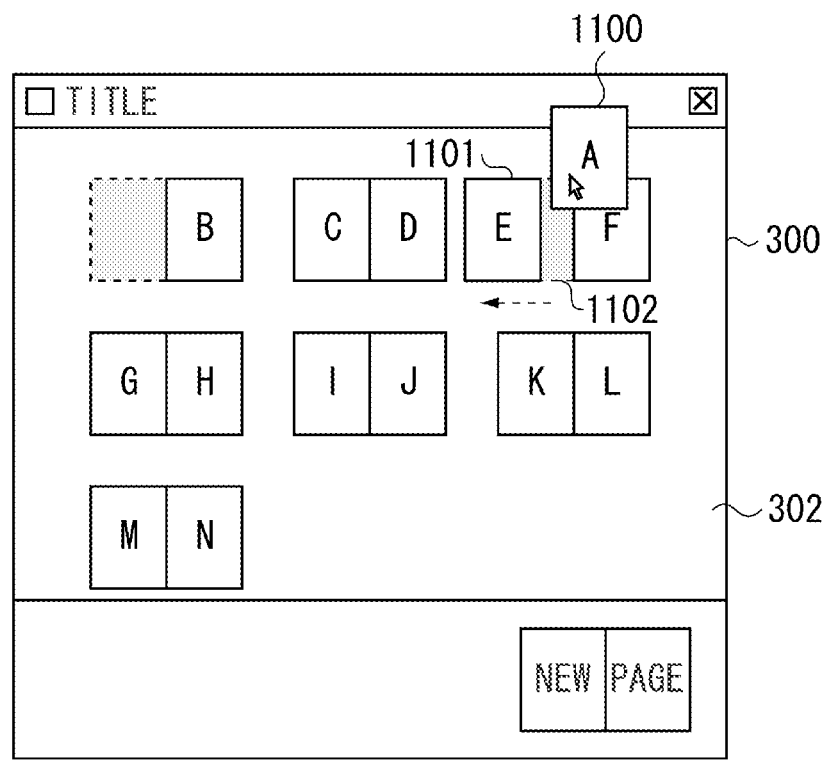
FIGS. 11A and 11B are diagrams illustrating windows according to an exemplary embodiment of the present invention.
Figure 11B:
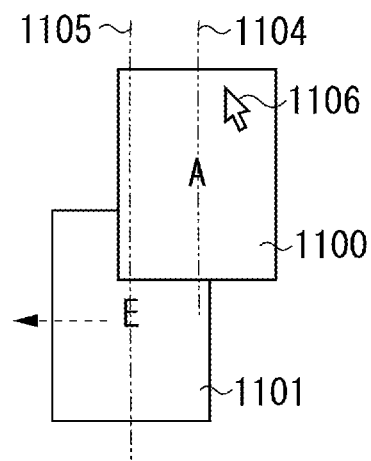

When the reduced image 1100 of the page "A" to be moved overlaps with the reduced image 1101 of the destination page "E", the CPU 108 compares a center line 1104 of the reduced image 1100 of the page "A" to be moved with the center line 1105 of the alignment position 1102 of the destination page "E" as illustrated in FIG. 11B. When the center line 1104 is located behind the center line 1105, the CPU 108 detects that the reduced image 1100 of the page "A" to be moved has approached the reduced image 1101 of the destination page "E" from behind.

Alternatively, the CPU 108 detects that, when a mouse cursor 1106 dragging the reduced image 1100 of the page "A" to be moved is located behind the center line 1105, the reduced image 1100 of the page "A" to be moved approaches the reduced image 1101 of the destination page "E" from behind.

Further, when the CPU 108 detects that the reduced image 1100 of the page "A" to be moved approaches the reduced image 1101 of the destination page "E" from the front and overlaps therewith, although the direction is opposite, similarly to the case of approaching from behind, the present exemplary embodiment can be also realized in a similar manner.

According to the present exemplary embodiment, the user can instinctively, visually recognize the changed destination of the page to be changed according to the direction operated by the user.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-050757 filed Mar. 8, 2010, which is hereby incorporated by reference herein in its entirety.

What is claimed is:

1. A layout editing apparatus that aligns a plurality of objects in order and displays the objects in a window, the layout editing apparatus comprising:
   a detection unit configured to detect that first one of the plurality of objects overlaps with a second one of the plurality of objects;
   a comparison unit configured to compare an alignment order of the first object and the second object;
   a display unit configured to display the second object shifting from an alignment position toward either a front or a back based on the result of the comparison; and
   a changing unit configured to change the alignment order of the second object corresponding to a direction of a position shifted from the alignment position where the second object was displayed, in response to a predetermined operation,
   wherein the layout editing apparatus comprises a processor executing program stored in a memory to implement at least a part of function of at least one of the units.

2. The layout editing apparatus according to claim 1, wherein, when the detection unit detects that the first object overlaps with the second object, according to a state in which the first object overlaps with the second object, the second object is displayed being shifted in either one of a horizontal or vertical direction to an alignment direction.

3. The layout editing apparatus according to claim 1, wherein the changing unit changes the alignment order of the first object into the alignment order corresponding to the alignment position where the second object was displayed, in response to the predetermined operation.

4. The layout editing apparatus according to claim 1, wherein the display unit displays only the second object among the plurality objects by automatically shifting the second object.

5. The layout editing apparatus according to claim 1, wherein the display unit displays the second object by shifting the second object toward the front, if the result of the comparison indicates that the alignment order of the first object is before the alignment order of the second object, and shifting the second object toward the back, if the result of the comparison indicates that the alignment order of the first object is behind the alignment order of the second object.

6. The layout editing apparatus according to claim 1, wherein the display unit shifts the second object so as to narrow distance between the second object and a third object, which is next to the second object in the direction of the position shifted.

7. The layout editing apparatus according to claim 1, wherein the object is an image.

8. A method for controlling a layout editing apparatus that aligns a plurality of objects in order and displays the objects in a window, the method comprising:
   detecting that first one of the plurality of objects overlaps with second one of the plurality of objects;
   comparing an alignment order of the first object and the second object;
   displaying, the second object shifting from an alignment position toward either a front or a back based on the result of the comparison; and
   changing the alignment order of the second object corresponding to a direction of a position shifted from the alignment position where the second object was displayed, in response to a predetermined operation,
   wherein the layout editing apparatus comprises a processor executing program stored in a memory to implement at least a part of function of at least one of the units.

9. A computer-readable storage medium storing a program that causes a computer to execute a method for controlling a layout editing apparatus that aligns a plurality of objects in order and displays the objects in a window, the method comprising:
   detecting that first one of the plurality of objects overlaps with second one of the plurality of objects;
   comparing an alignment order of the first object and the second object;
   displaying, the second object shifting from an alignment position toward either a front or a back based on the result of the comparison; and
   changing the alignment order of the second object corresponding to a direction of a position shifted from the alignment position where the second object was displayed, in response to a predetermined operation,
   wherein the layout editing apparatus comprises a processor executing program stored in a memory to implement at least a part of function of at least one of the units.

10. An image display apparatus comprising:
   an arrangement display unit configured to display and arrange a plurality of images in a predetermined order on a screen;
   a moving display unit configured to display and move a first image among the plurality of images in response to a user's dragging operation; and
   a shift display unit configured to display and shift a second image among the plurality of images from an arrangement position toward a predetermined direction based on position relations between the first image and the second image displayed by the arrangement display unit, if the moved first image overlaps with the second image, wherein the image display apparatus comprises a processor executing program stored in a memory to implement at least a part of function of at least one of the units.

11. The image display apparatus according to claim 10, wherein the shift display unit shifts only the second image among the plurality of images automatically.

12. The image display apparatus according to claim 10, wherein the shift display unit shifts the second image forward, if the first image was displayed ahead of the second image by the arrangement display unit, and shifts the second image backward, if the first image was displayed back of the second image by the arrangement display unit.

13. The image display apparatus according to claim 10, further comprising:
   a changing unit configured to change the order of the second image corresponding to a direction of the shifting, in response to a user's drop operation for the first image.

14. The image display apparatus according to claim 10, wherein the shift display unit shifts the second image so as to narrow distance between the second image and a third image, which is displayed next to the second image in the direction of the shifting by the arrangement display unit.

* * * * *